M. J. WHELAN.
BOWLING PIN.
APPLICATION FILED DEC. 20, 1915.
1,182,882.
Patented May 9, 1916.
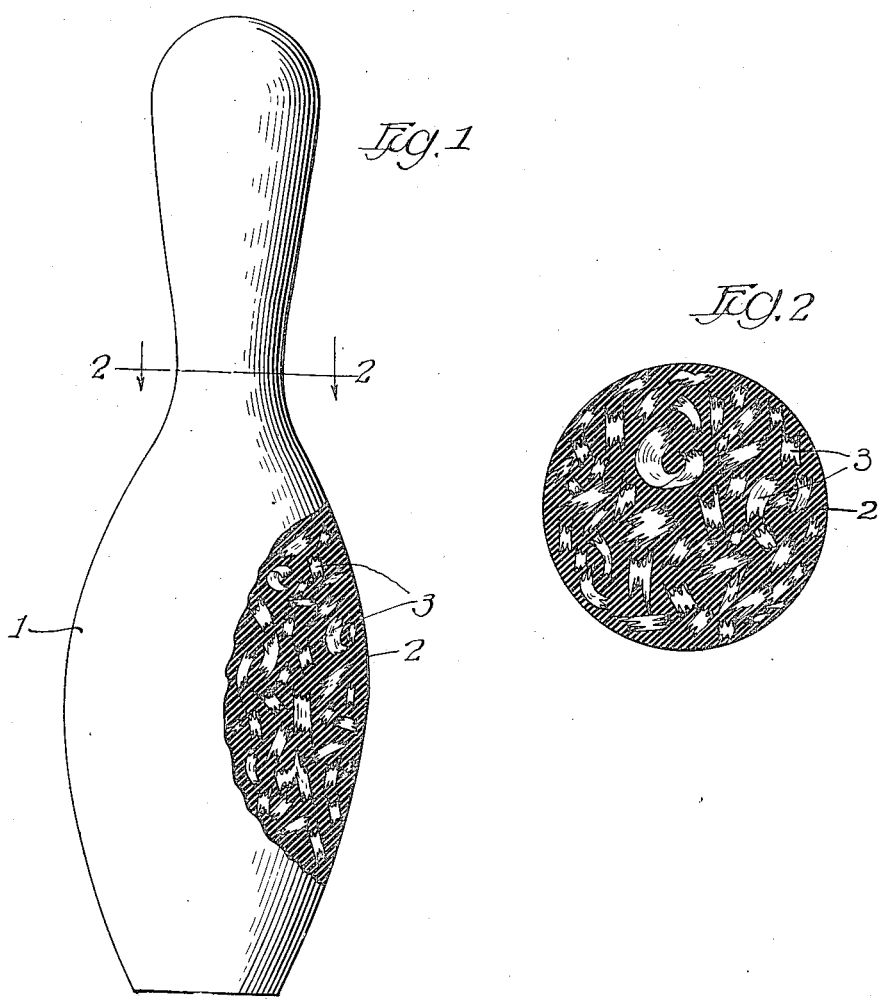

UNITED STATES PATENT OFFICE.

MICHAEL JAMES WHELAN, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

BOWLING-PIN.

1,182,882.

Specification of Letters Patent.

Patented May 9, 1916.

Application filed December 20, 1915. Serial No. 67,872.

*To all whom it may concern:*

Be it known that I, MICHAEL J. WHELAN, a citizen of the United States, residing at Muskegon, in the county of Muskegon and State of Michigan, have invented certain new and useful Improvements in Bowling-Pins, of which the following is a specification.

This invention relates to bowling pins.

Bowling pins are at present usually constructed of maple, an extremely expensive wood, the supply of which is rapidly becoming more limited, and it is desirable to provide a substitute therefor which is equal or superior to maple in withstanding the rough usage to which bowling pins are subjected.

It is the object, therefore, of my invention to provide a durable and relatively inexpensive bowling pin constructed of a composition comprising a rubber compound having fibrous material thoroughly incorporated therewith.

Further objects and advantages of my invention will be apparent as it is better understood by reference to the following specification when read in connection with the accompanying drawing illustrating the preferred embodiment thereof in which Figure 1 is a side elevation, partially in section, of a bowling pin, and Fig. 2 is a horizontal section on the line 2—2 of Fig. 1 somewhat enlarged.

Referring to the drawing, 1 indicates a pin of standard size and form, the body of which consists of a hard rubber compound, indicated at 2, having fibrous material 3 thoroughly incorporated therewith.

The rubber compound employed may include the usual ingredients of such compounds as well-known in the art, such as gum rubber and sulfur, and the fibrous material preferably consists of wood shavings, ground or shredded wood, sticks or slivers, the proportions of the ingredients varying from 15% to 85% by weight of rubber compound and from 85% to 15% by weight of fibrous material. I have found by experiment that the most desirable proportions are approximately 85% by weight of fibrous material and 15% by weight of rubber compound. Hard wood shavings from planers form an extremely desirable material for use in the composition.

To produce the composition I first work the rubber in a suitable rubber mixer of well-known form and construction to a consistency similar to that of molasses candy when ready to pull. The rolls of the rubber mixer are then separated until they are approximately one-fourth of an inch apart and the shavings and other fibrous material are added, the mixture being worked until the ingredients are thoroughly mixed, so that the fibrous material is uniformly coated with the rubber compound. The mass is then removed from the mixer and packed in molds of desired form, subjected to pressure to compact the mass and vulcanized in the usual manner under pressure.

The resulting composition is hard, dense and neither flexible nor brittle and is, therefore, exceedingly durable. It can be sawed, machined, tooled, buffed and will receive a high polish. The composition is of such a character that wood screws can be employed without tapping and the material can be tapped to receive machine screws.

The pin 1 is formed from the above-described composition either by molding the composition in suitable molds shaped in accordance with the proportions of standard bowling pins, after which the mass is vulcanized in the mold under pressure or, if desired, suitable blanks may be molded in a similar manner and subsequently turned in a lathe to the desired form.

Various changes may be made in the form of the pin illustrated as well as in the proportions and components of the composition without departing from the spirit and scope of the invention as defined in the accompanying claims, the description covering merely the preferred embodiments of the invention.

I claim:

1. As a new article of manufacture, a bowling pin, the body of which consists of a composition of hard vulcanized rubber having fibrous material thoroughly incorporated therewith.

2. As a new article of manufacture, a bowling pin, the body of which consists of a composition of hard vulcanized rubber having wood shavings thoroughly incorporated therewith.

3. As a new article of manufacture, a bowling pin, the body of which consists of a composition of hard vulcanized rubber, and wood shavings in substantially the proportions of 15% or more by weight of hard rubber compound and 85% or less by weight of fibrous material.

4. As a new article of manufacture, a bowling pin, the body of which consists of a composition of hard vulcanized rubber and wood shavings in substantially the proportions of 15% by weight of hard rubber compound and 85% by weight of wood shavings.

MICHAEL JAMES WHELAN.

Witnesses:
CLARENCE J. AHUSTROM,
F. J. LOEWE.